UNITED STATES PATENT OFFICE.

HARRY WILLIAMS CHARLTON, OF NEW YORK, N. Y., ASSIGNOR TO KAOLIN PRODUCTS CORPORATION, A VIRGINIA COMPANY.

PROCESS OF REPLACING ALKALI METALS IN ALKALI-METAL-CARRYING ROCKS AND PRODUCT THEREOF.

1,256,295.     Specification of Letters Patent.     Patented Feb. 12, 1918.

No Drawing.     Application filed May 3, 1916. Serial No. 95,113.

*To all whom it may concern:*

Be it known that I, HARRY WILLIAMS CHARLTON, a citizen of Canada, residing at New York, in the county of New York and the State of New York, have invented new and useful Improvements in Processes of Replacing Alkali Metals in Alkali-Metal-Carrying Rocks and Products Thereof, of which the following is a specification.

This invention relates to a process of producing alkali metal carbonates associated in nearly every case with more or less alkali metal hydrates present not as desired end products but as a result of incomplete transformation owing probably to mass action. It has for its object the provision of a method which will be simple in its nature, comparatively easy to carry out and less costly to operate than those heretofore proposed.

With these and other objects in view the invention consists in the novel steps and combination of steps constituting the process, all as will be more fully hereinafter disclosed and particularly pointed out in the claims.

As an example of my process, I may digest from 3 to 6 parts of feldspar, etc., with from 7 to 2 parts of a mixture of lime and calcium carbonate, in from 44 to 26 parts of water at pressures above 200 pounds and corresponding temperatures. I may have present an amount of calcium carbonate amounting to perhaps from 5 to 10% of the mixture, but the extent of the carbonating action is more dependent on the nature or physical condition of the calcium carbonate than upon its amount, provided always that there is sufficient present to impart its $CO_2$ to the alkali metal appearing as such in the end product. A precipitated or air-formed carbonate such as cull lime is always more active than a crystalline or naturally occurring one, present, for example, if either imperfectly burnt, dolomitic or ordinary, lime is used.

The efficiency of the process depends largely upon the pressures and temperatures employed, and it has been found that one in the region of 200 pounds or above is necessary. This is required not only to convert the residue into a cementing material to be used in the manufacture of steam-hardened plastics, but to obtain an economical yield of a potassium compound and complete the liberation in a reasonable time.

Although the extent of the carbonating action upon the alkali metal varies considerably under different conditions, it is found that carried out on a large scale in a large digester and employing commercial materials, the action is not complete. It, therefore, follows that almost invariably there remains more or less carbonate in the insoluble residue. The applicant is unable to determine the action of this small amount of calcium carbonate, but it certainly is not a detriment to the product inasmuch as very high grade brick have been produced when an immense amount of calcium carbonate was present. The action of the small amount of the calcium carbonate is as yet more or less a matter of conjecture.

As is generally conceded, so called "potash feldspar" always contains more or less sodium in combination. This statement is amply borne out by the analyses of feldspar deposits in bulletins of the U. S. Geological Survey, such as Bureau of Mines Bulletin 92. This sodium has ultimately to be removed and it can best be accomplished by converting both into bicarbonate. This is one of the advantages of carbonating, if only to a limited degree, in the initial digestion. The great necessity of carbonating is more fully dealt with in my copending application Serial No. 106,012, filed June 26th, 1916.

The above mentioned insoluble residue is white in color and it remains plastic in the moist state.

It is obvious that those skilled in the art may vary the details of the process as well as of the product without departing from the spirit of the invention, and, therefore, I do not wish to be limited to the above disclosures except as may be required by the claims.

I claim:

1. A process of replacing alkali metals in potassium-sodium feldspars and aiding their separation from the insoluble residue by causing them to enter into solution in the digesting liquid, which comprises digesting the finely ground material with a mixture of alkali earth metal hydrate and carbonate at pressures above 200 pounds and at corresponding temperatures; substantially as described.

2. A process of replacing alkali metals in potassium-sodium feldspars and aiding their separation from the insoluble residue by causing them to enter into solution in the digesting liquid, which comprises digesting the finely ground material with a mixture of calcium hydrate and carbonate at pressures above 200 pounds and at corresponding temperatures; substantially as described.

3. As a new product the insoluble residue resulting from the digestion of a potassium-sodium feldspar at pressures above 200 pounds and at corresponding temperatures with a mixture of an alkali earth metal hydrate and carbonate, the same comprising a hydrous silicate of aluminium and an alkali earth metal, associated with a small proportion of an alkali earth metal carbonate; substantially as described.

4. As a new product the insoluble residue resulting from the digestion of a potassium-sodium feldspar at pressures of 200 pounds or over and at corresponding temperatures with a mixture of calcium hydrate and carbonate, the same comprising a hydrous calcium aluminium silicate associated with a small proportion of calcium carbonate; substantially as described.

HARRY WILLIAMS CHARLTON.

Witnesses:
G. T. CARPENTER,
W. E. FEE.

Copies of this patent may be obtained for five cents each, by addressing the "Commissioner of Patents, Washington, D. C."